United States Patent
Kim et al.

(10) Patent No.: US 9,755,800 B2
(45) Date of Patent: Sep. 5, 2017

(54) METHOD AND DEVICE FOR CANCELING INTERFERENCE AND RECEIVING DATA IN WIRELESS COMMUNICATION SYSTEM

(71) Applicant: LG ELECTRONICS INC., Seoul (KR)

(72) Inventors: Hyungtae Kim, Seoul (KR); Jonghyun Park, Seoul (KR); Hanbyul Seo, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/772,061

(22) PCT Filed: Mar. 19, 2014

(86) PCT No.: PCT/KR2014/002304
§ 371 (c)(1),
(2) Date: Sep. 1, 2015

(87) PCT Pub. No.: WO2014/148811
PCT Pub. Date: Sep. 25, 2014

(65) Prior Publication Data
US 2016/0013903 A1    Jan. 14, 2016

Related U.S. Application Data

(60) Provisional application No. 61/803,433, filed on Mar. 19, 2013.

(51) Int. Cl.
*H04W 72/04* (2009.01)
*H04L 5/00* (2006.01)
(Continued)

(52) U.S. Cl.
CPC ......... *H04L 5/0048* (2013.01); *H04B 7/0456* (2013.01); *H04J 11/005* (2013.01);
(Continued)

(58) Field of Classification Search
CPC ............ H04L 5/00; H04B 7/04; H04W 72/12; H04W 72/08; H04W 74/00
See application file for complete search history.

(56) References Cited

U.S. PATENT DOCUMENTS

| 2012/0201162 A1* | 8/2012 | Kim ..................... H04B 17/345 370/252 |
| 2013/0005269 A1* | 1/2013 | Lindoff ................ H04J 11/0026 455/63.1 |
| 2013/0021991 A1* | 1/2013 | Ko ........................ H04B 7/0413 370/329 |

FOREIGN PATENT DOCUMENTS

| KR | 10-0951382 | 4/2010 |
| KR | 10-2011-0046231 | 5/2011 |

(Continued)

OTHER PUBLICATIONS

Lee, Quasi Co-Located Operation for Dynamic Resource Utilization, U.S. Appl. No. 61/740,447, p. 1-13.*

(Continued)

*Primary Examiner* — Lakeram Jangbahadur
(74) *Attorney, Agent, or Firm* — Lee Hong Degerman Kang Waimey

(57) ABSTRACT

The present invention relates to a wireless communication system. A method by which a terminal cancels interference and receives data in a wireless communication system, according to one embodiment of the present invention, comprises the steps of receiving first downlink control information (DCI) including scheduling information for receiving a physical downlink shared channel (PDSCH) from a base station, receiving second DCI including scheduling information on an interference channel from a second base station, and canceling the interference from the second base station on the basis of the first DCI and the second DCI, and receiving the PDSCH.

10 Claims, 11 Drawing Sheets

(51) Int. Cl.
  H04J 11/00    (2006.01)
  H04B 7/0456   (2017.01)
  H04W 72/08    (2009.01)
  H04W 72/12    (2009.01)
  H04W 74/00    (2009.01)
  H04L 1/00     (2006.01)

(52) U.S. Cl.
  CPC ............ *H04L 1/00* (2013.01); *H04W 72/082* (2013.01); *H04W 72/1273* (2013.01); *H04W 74/006* (2013.01); *H04W 72/1289* (2013.01)

(56) References Cited

FOREIGN PATENT DOCUMENTS

| KR | 10-2012-0070600 | 6/2012 |
| KR | 10-2013-0004360 | 1/2013 |
| WO | 2012/146095 | 11/2012 |

OTHER PUBLICATIONS

PCT International Application No. PCT/KR2014/002304, Written Opinion of the International Searching Authority dated Jun. 25, 2014, 12 pages.

PCT International Application No. PCT/KR2014/002304, Written Opinion of the International Searching Authority dated Jun. 25, 2014, 15 pages.

* cited by examiner

FIG. 5
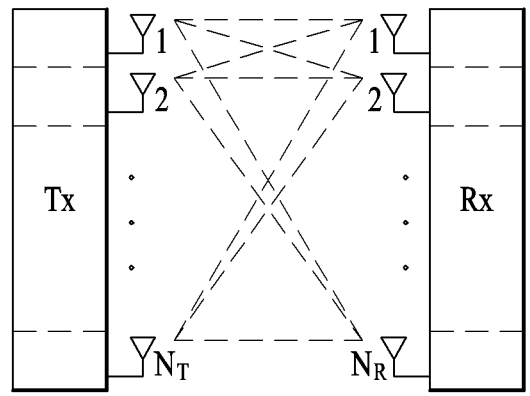
(a)
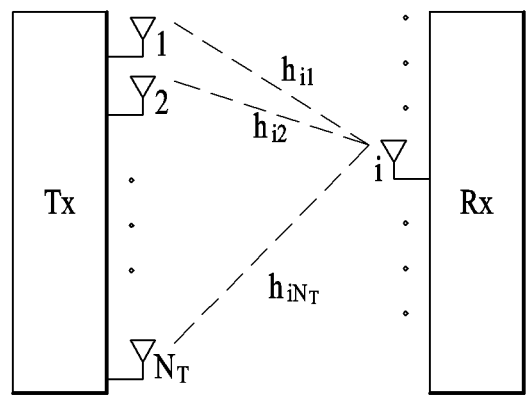
(b)

METHOD AND DEVICE FOR CANCELING INTERFERENCE AND RECEIVING DATA IN WIRELESS COMMUNICATION SYSTEM

CROSS-REFERENCE TO RELATED APPLICATIONS

This application is the National Stage filing under 35 U.S.C. 371 of International Application No. PCT/KR2014/002304, filed on Mar. 19, 2014, which claims the benefit of U.S. Provisional Application No. 61/803,433, filed on Mar. 19, 2013, the contents of which are all hereby incorporated by reference herein in their entirety.

TECHNICAL FIELD

The present invention relates to wireless communication system, and more particularly, to a method for canceling interference and receiving data in a wireless communication system and a device for supporting the same.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-precoded channel information. Accordingly, a receiver of a system according to LTE-A standard can define a RS for acquisition of channel state information (CSI), that is, CSI-RS.

DISCLOSURE

Technical Problem

Based on the aforementioned discussion, an object of the present invention is to provide a method and device for transmitting and receiving channel state information in a wireless communication system.

The technical objects that can be achieved through the present invention are not limited to what has been particularly described hereinabove and other technical objects not described herein will be more clearly understood by persons skilled in the art from the following detailed description.

Technical Solution

To solve the aforementioned problem, according to one embodiment of the present invention, a method for enabling a user equipment to cancel interference and receive data in a wireless communication system comprises the steps of receiving first downlink control information (DCI) including scheduling information for receiving a physical downlink shared channel (PDSCH) from a base station; receiving second DCI including scheduling information on an interfering channel from a second base station; and canceling interference from the second base station on the basis of the first DCI and the second DCI and receiving the PDSCH.

According to one embodiment of the present invention, a user equipment for canceling interference and receiving data in a wireless communication system comprises radio frequency (RF) units; and a processor, wherein the processor is configured to receive first downlink control information (DCI) including scheduling information for receiving a physical downlink shared channel (PDSCH) from a base station, receive second DCI including scheduling information on an interfering channel from a second base station, and cancel interference from the second base station on the basis of the first DCI and the second DCI and receive the PDSCH.

Followings may commonly be applied to the embodiments of the present invention.

The first DCI may include information on a search space of the second DCI.

The first DCI may include a 1-bit indicator as to whether the second DCI is transmitted.

The second DCI may be configured to omit information on a starting symbol of the interfering channel, and the interfering channel may be configured to start prior to the PDSCH.

The first DCI and the second DCI may be quasi co-located through their respective PQIs (PDSCH RE mapping and quasi co-location indicator) independent from each other.

Each of the PQIs may include a virtual cell ID for generating a demodulation reference signal (DMRS).

The method may further comprise the step of receiving a validity flag as to whether data received through the interfering channel will be discarded after the interference cancelation, by using the second DCI.

The scheduling information included in the second DCI may be transmitted through a field of a fixed size within the second DCI.

The first DCI and the second DCI may be configured by their respective quasi co-located behaviors independent from each other.

The first DCI and the second DCI may be transmitted through their respective transmission modes independent from each other.

The first DCI and the second DCI may be demodulated based on their respective reference signals (RSs) different from each other.

Rate matching information may be omitted for the second DCI, and interference demodulation instead of interference decoding may only be performed for the interfering channel.

If both the first DCI and the second DCI correspond to DMRS based transmission, the sum o f the number of layers of the first DCI and the second DCI may be restricted so as not to exceed a reference value.

The method may further comprise the step of receiving information on quasi co-located configuration between a common reference signal (CRS) and a demodulation reference signal (DMRS) for the second base station.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a schematic diagram illustrating a wireless communication system having multiple antennas.

BEST MODE FOR CARRYING OUT THE INVENTION

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE—Advanced (LTE-A) is an evolved version of 3GPP LTE. WiMAX can be explained by IEEE 802.16e (wireless-MAN-OFDMA reference system) and advanced IEEE 802.16m (wirelessMAN-OFDMA advanced system). For clarity, the following description focuses on IEEE 802.11 systems. However, technical features of the present invention are not limited thereto.

Figure 1:
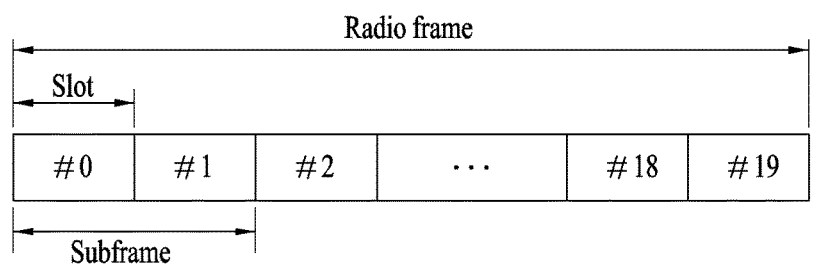
FIG. 1 is a diagram illustrating an example of a structure of a downlink radio frame.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
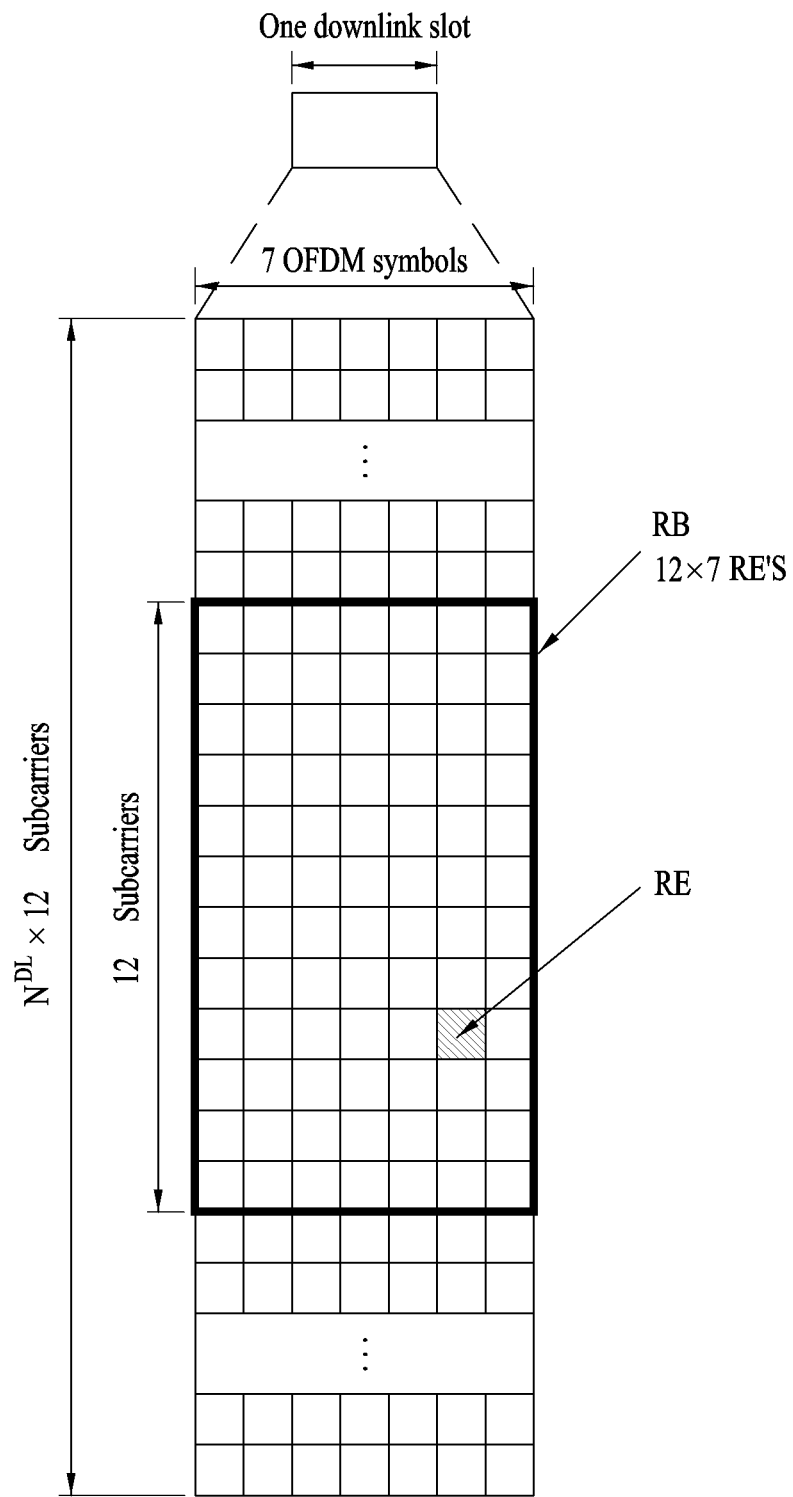
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a $k_{th}$ subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. $N^{DL}$ is number of RBs in a downlink slot. $N^{DL}$ depends on a downlink transmission bandwidth configured by BS scheduling.

Figure 3:
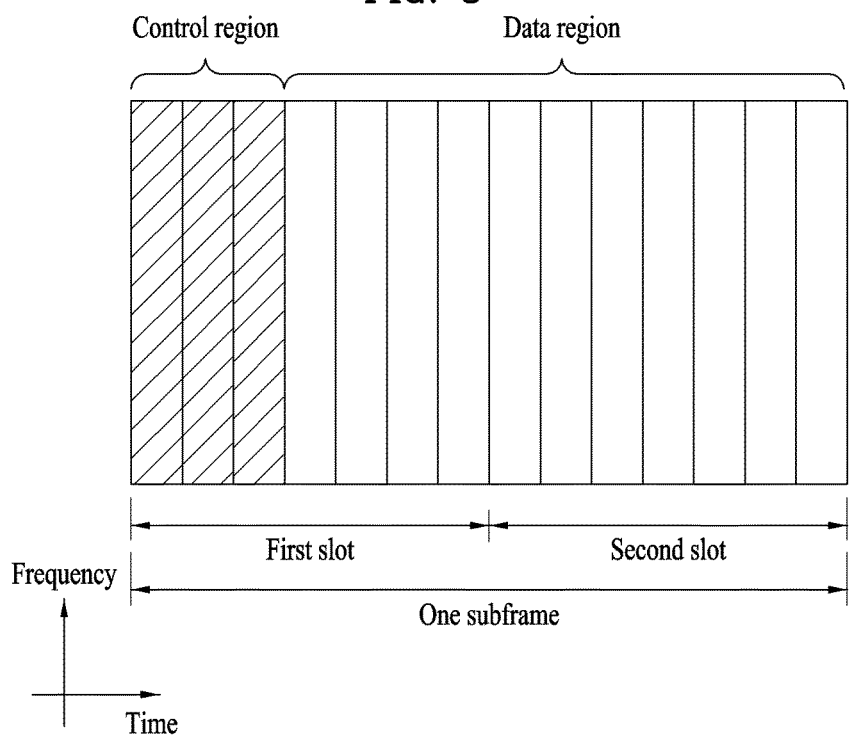
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
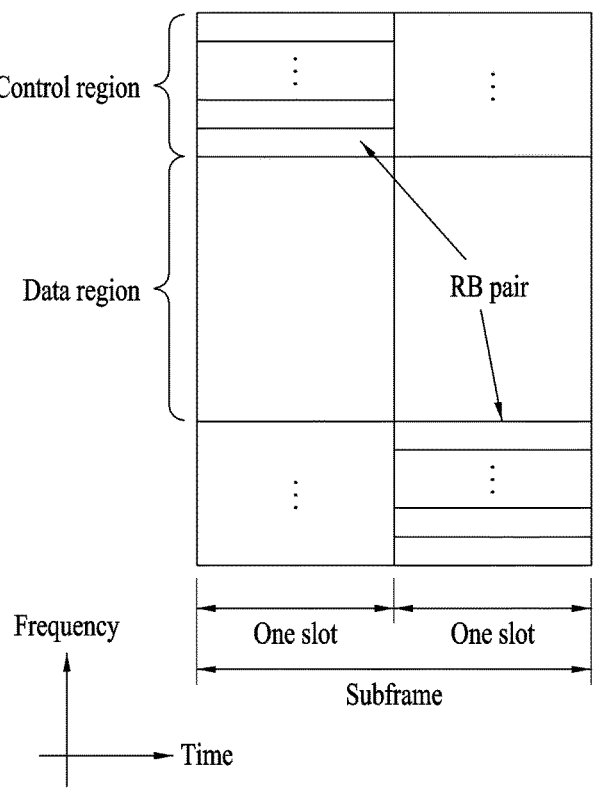
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate $R_o$ that may be achieved with a single antenna and a transmission rate increase Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that $N_T$ Tx antennas and $N_R$ Rx antennas are present in the system.

Regarding a transmission signal, up to $N_T$ pieces of information can be transmitted through the $N_T$ Tx antennas, as expressed in Equation 2 below.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vectors $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{11} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

Here, $W_{ij}$ refers to a weight between an $i_{th}$ Tx antenna and $j_{th}$ information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector(s) have different values. In the case of spatial diversity, the same signal is repeatedly transmitted through a plurality of channel paths and thus elements of information vectors(s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of $N_R$ Rx antennas, a reception signal of each antenna may be expressed as the vector shown in Equation 6 below.

$$y = [y_1, y_2, \ldots, y_{N_R}]^T \qquad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by $h_{ij}$. It should be noted that the index order of the channel $h_{ij}$ is located before a reception (Rx) antenna index and is located after a transmission (Tx) antenna index.

FIG. 5(b) illustrates channels from $N_T$ Tx antennas to an Rx antenna i. The channels may be collectively represented in the form of vector and matrix. Referring to FIG. 5(b), the channels passing the range from the $N_T$ Tx antennas to the Rx antenna i can be represented by the Equation 7 below.

$$h_i^T = [h_{i1}, h_{i2}, \ldots, j_{iN_T}] \qquad \text{[Equation 7]}$$

All channels passing the range from the $N_T$ Tx antennas to $N_R$ Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Additive white Gaussian noise (AWGN) is added to an actual channel which has passed the channel matrix. The AWGN ($n_1, n_2, \ldots, n_{N_R}$) added to each of $N_R$ reception (Rx) antennas can be represented by Equation 9 below.

$$n = [n_1, n_2, \ldots, n_{N_R}]^T \qquad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

[Equation 10]

The number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
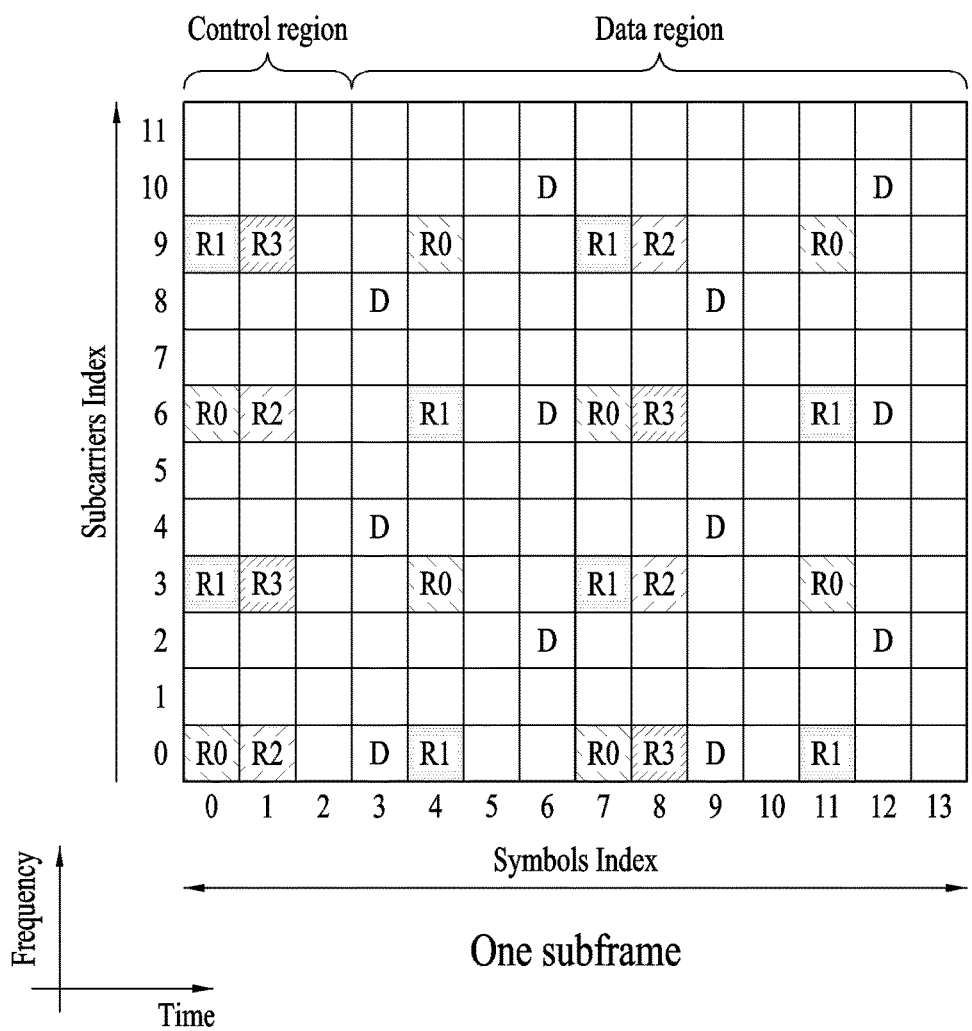
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
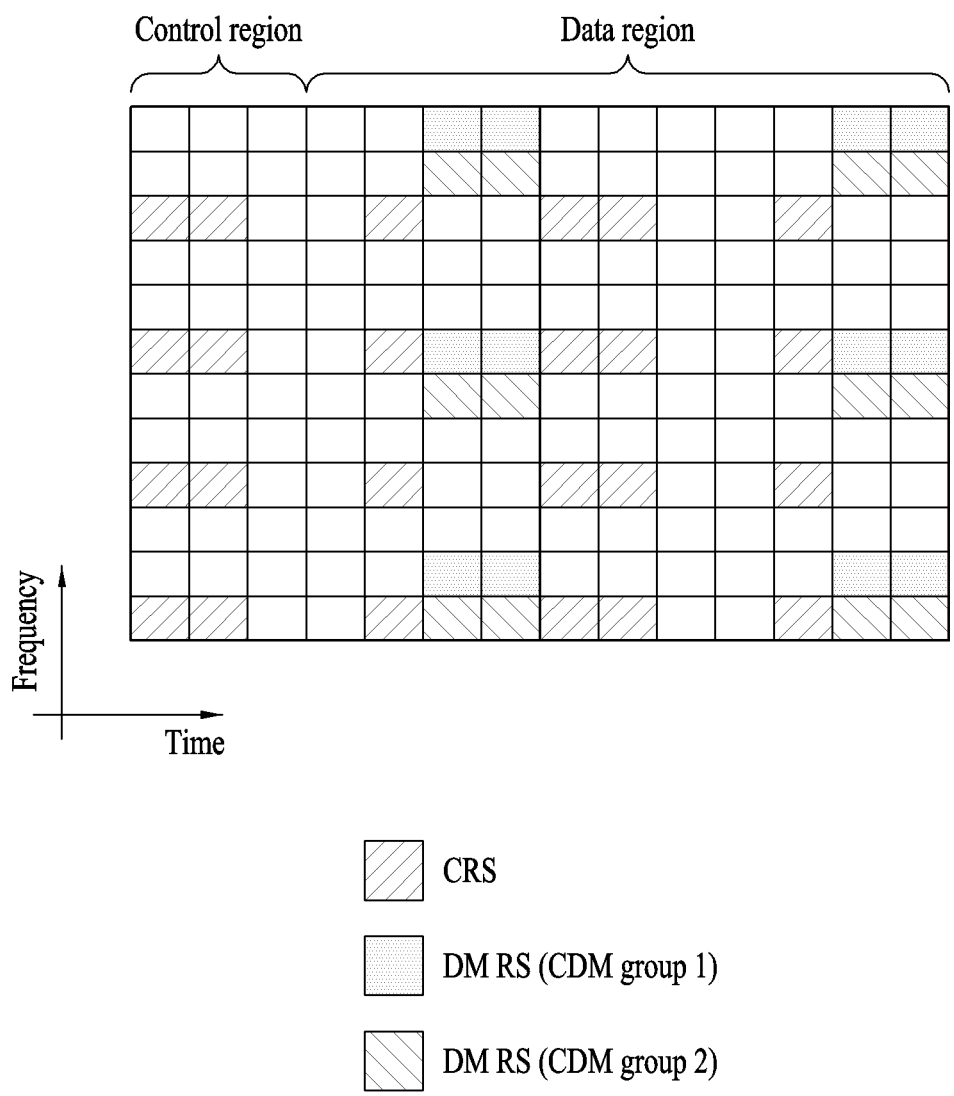
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
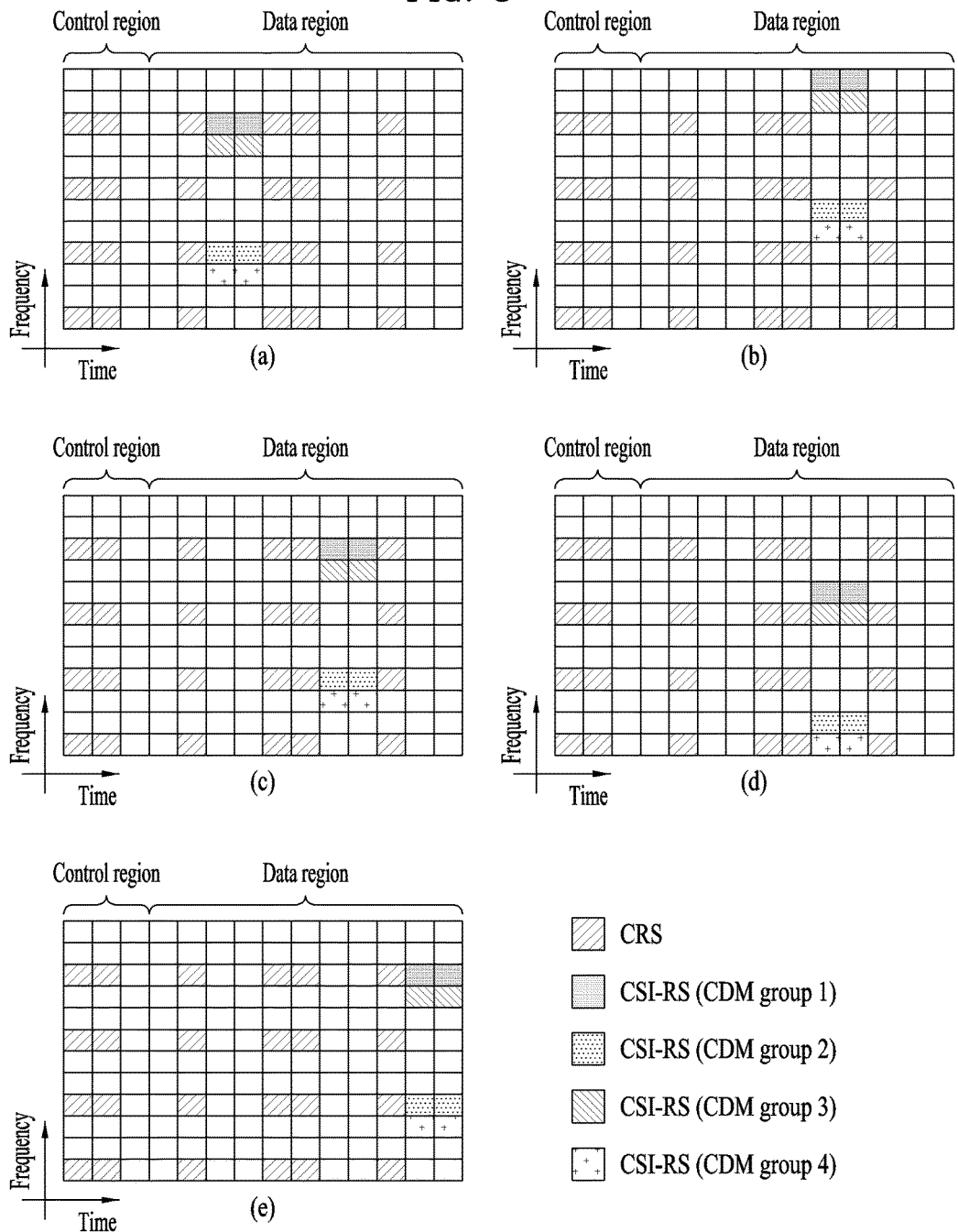
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

The RS patterns of FIGS. 6 to 8 are only exemplary, and application of various embodiments of the present invention is not limited to a specific RS pattern. That is, various embodiments of the present invention may equally be applied to even a case where RS patterns different from those of FIGS. 6 to 8 are defined and used.

CSI-RS Configuration

Among the plurality of CSI-RSs and the plurality of IMRs, which are configured for the UE, one CSI process may be defined by associating one CSI-RS resource for signal measurement with one interference measurement resource (IMR) for interference measurement. The UE feeds back CSI information derived from different CSI processes to the network (for example, base station) by using an independent period and subframe offset.

In other words, each CSI process has independent CSI feedback configuration. Association information on the CSI-RS resource and the IMR resource and CSI feedback configuration may be notified from the base station to the UE through higher layer signaling such as RRC per CSI process. For example, it is assumed that three CSI processes are configured for the UE as illustrated in Table 1.

TABLE 1

| CSI Process | Signal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 respectively represent CSI-RS received from a cell 1 which is a serving cell of the UE and CSI-RS received from a cell 2 which is a neighboring cell which joins cooperation. It is assumed that IMR configured for each CSI process of Table 1 is configured as illustrated in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

In IMR 0, the cell 1 performs muting, the cell 2 performs data transmission, and the UE is configured to measure interference from the other cells except the cell 1. Likewise, in IMR 1, the cell 2 performs muting, the cell performs data transmission, and the UE is configured to measure interference from the other cells the cell 2. Also, in IMR 2, both the cell 1 and the cell 2 perform muting, and the UE is configured to measure interference from the other cells except the cell 1 and the cell 2.

Accordingly, as illustrated in Table 1 and Table 2, CSI information of the CSI process 0 represents optimized RI, PMI and CQI information if data are received from the cell 1. CSI information of the CSI process 1 represents optimized RI, PMI and CQI information if data are received from the cell 2. CSI information of the CSI process 2 represents optimized RI, PMI and CQI information if data are received from the cell 1 and if there is no interference from the cell 2.

It is preferable that a plurality of CSI processes configured for one UE may share dependent values for CoMP scheduling. For example, in case of joint transmission (JP) of the cell 1 and the cell 2, if a CSI process 1 which regards a channel of the cell 1 as a signal part and a CSI process 2 which regards a channel of the cell 2 as a signal part are configured for one UE, the CSI process 1 and the CSI process 2 need to have the same rank and subband indexes in order to easily perform JT scheduling.

A period or pattern for transmission of the CSI-RS may be configured by the base station. In order to measure the CSI-RS, the UE should know CSI-RS configuration for each CSI-RS antenna port of a cell to which the UE belongs. The CSI-RS configuration may include a downlink subframe index to which the CSI-RS is transmitted, time-frequency location (for example, CSI-RS pattern as shown in FIGS.

8(a) to 8(e)) of a CSI-RS resource element (RE) within a transmission subframe, and a CSI-RS sequence (sequence used for CSI-RS and generated pseudo-randomly in accordance with a predetermined rule on the basis of a slot number, cell ID, a CP length, etc.). That is, a plurality of CSI-RS configurations may be used by a given base station, and the base station may notify UEs within a cell of a CSI-RS configuration which will be used for the UEs among a plurality of CSI-RS configurations.

Also, since the CSI-RS for each antenna port is needed to be identified from another one, resources to which the CSI-RS for each antenna port is transmitted should be orthogonal to one another. As described with reference to FIG. 8, the CSI-RSs for each antenna port may be multiplexed in accordance with an FDM mode, a TDM mode and/or a CDM mode by using orthogonal frequency resources, orthogonal time resources and/or orthogonal code resources.

When the base station reports information (CSI-RS configuration) on CSI-RS to UEs within a cell, the base station should first notify the UEs of information on time-frequency into which the CSI-RS for each antenna port is mapped. In more detail, the information on time may include subframe numbers to which the CSI-RS is transmitted, a transmission period of the CSI-RS, subframe offset for transmission of the CSI-RS, and OFDM symbol number to which a CSI-RS resource element (RE) of a specific antenna is transmitted. The information on frequency may include a frequency spacing to which the CSI-RS resource element (RE) of a specific antenna is transmitted, offset or shift value of RE on a frequency axis, etc.

Figure 9:
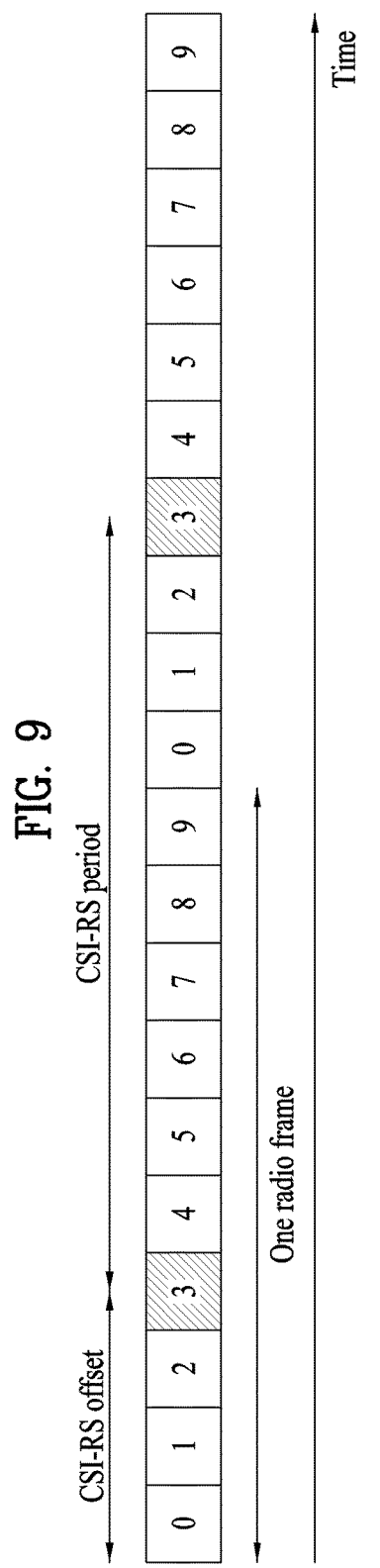
FIG. 9 is a diagram illustrating an example of periodically transmitting a CSI-RS.

FIG. 9 is a diagram illustrating an example of periodically transmitting a CSI-RS. The CSI-RS may be transmitted periodically with a period (for example, a period of 5 subframes, a period of 10 subframes, a period of 20 subframes, a period of 40 subframes, or a period of 80 subframes) of an integer multiple of one subframe.

In FIG. 9, one radio frame includes 10 subframes (subframe numbers 0 to 9). For example, in FIG. 9, a transmission period of the CSI-RS of the base station is 10 ms (that is, 10 subframes), and CSI-RS transmission offset is 3. Each offset value may be varied for each base station, whereby CSI-RSs of various cells may uniformly be distributed on the time. If the CSI-RS is transmitted with a period of 10 ms, the offset value may have one of 0 to 9. Similarly, if the CSI the CSI-RS is transmitted with a period of 5 ms, the offset value may have one of 0 to 4, if the CSI-RS is transmitted with a period of 20 ms, the offset value may have one of 0 to 19, if the CSI-RS is transmitted with a period of 40 ms, the offset value may have one of 0 to 39, and if the CSI-RS is transmitted with a period of 80 ms, the offset value may have one of 0 to 79. This offset value represents a value of a subframe at which the base station starts CSI-RS transmission with a predetermined period. If the base station notifies the UE of a transmission period and offset value of the CSI-RS, the UE may receive the CSI-RS of the base station at the location of the corresponding subframe by using the notified value. The UE measures a channel through the received CSI-RS, and as a result, may report information such as CQI, PMI and/or RI (Rank Indicator) to the base station. Herein, CQI, PMI and RI may collectively be referred to as CQI (or CSI) except that CQI, PMI and RI are described separately. Also, the transmission period and offset of the CSI-RS may separately be designated per CSI-RS configuration.

Figure 10:
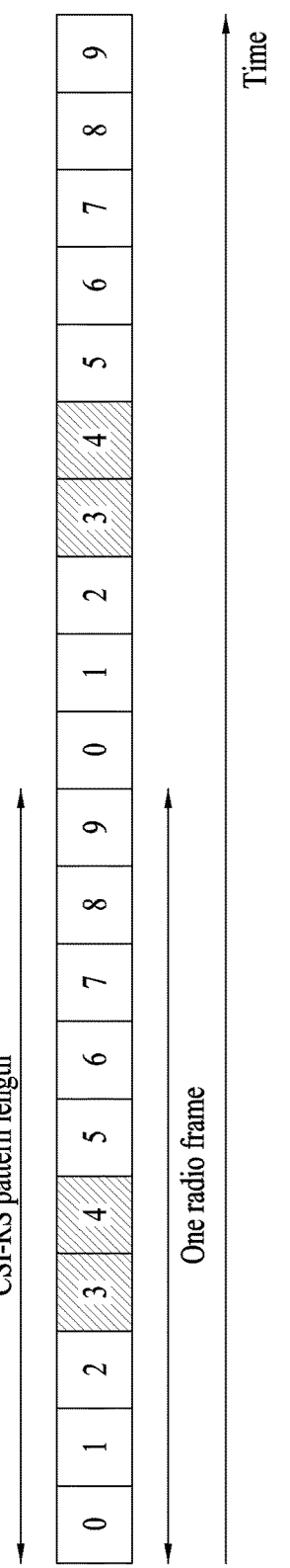
FIG. 10 is a diagram illustrating an example of non-periodically transmitting a CSI-RS.

FIG. 10 is a diagram illustrating an example of non-periodically transmitting a CSI-RS. In FIG. 10, one radio frame includes 10 subframes (subframe numbers 0 to 9). A subframe to which the CSI-RS is transmitted may be represented by a specific pattern as shown in FIG. 10. For example, a CSI-RS transmission pattern may be configured in a unit of 10 subframes, and CSI-RS transmission at each subframe may be designated by a 1-bit indicator. A CSI-RS pattern transmitted at subframe indexes 3 and 4 within 10 subframes (subframe indexes 0 to 9) is shown in the example of FIG. 10. The indicator may be provided to the UE through higher layer signaling.

Various configurations for CSI-RS transmission may be configured as described above. In order that the UE performs channel measurement by normally receiving the CSI-RS, the base station needs to notify the UE of CSI-RS configuration. Embodiments of the present invention related to notification of CSI-RS configuration to the UE will be described hereinafter.

Notification Scheme of CSI-RS Configuration

Generally, as schemes for enabling a base station to notify a UE of CSI-RS configuration, two schemes may be considered as follows.

The first scheme is that the base station broadcasts information on CSI-RS configuration to UEs by using dynamic broadcast channel (DBCH) signaling.

In the legacy LTE system, when notifying the UEs of a message related to system information, the base station may generally transmit the corresponding information through a BCH (Broadcast Channel). If the base station cannot transmit the message related to the system information through the BCH only due to too much message related to the system information, the base station may transmit the system information like general downlink data, wherein PDCCH CRC of corresponding data is masked using system information identifier (SI-RNTI) not a specific UE identifier (for example, C-RNTI) to transmit the system information. In this case, the actual system information is transmitted on a PDSCH region like general unicast data. Therefore, all the UEs in a cell may decode a PDCCH by using SI-RNTI and then acquire system information by decoding a PDSCH indicated by the corresponding PDCCH. The broadcasting scheme as above may be referred to as DBCH (Dynamic BCH) to be identified from PBCH (Physical BCH) which is a general broadcasting scheme.

Meanwhile, the system information broadcasted in the legacy LTE system may be categorized into two types. One type is a master information block (MIB) transmitted through the PBCH, and the other one type is a system information block (SIB) transmitted by being multiplexed with general unicast data on the PDSCH region. Since information transmitted as SIB type 1 to SIB type 8 (SIB1 to SIB8) is defined in the legacy LTE system, a new SIB type may be defined for information on CSI-RS configuration, which is new system information which is not defined in the legacy SIB types. For example, SIB9 to SIB10 may be defined, whereby the base station may notify the UEs within a cell of information on CSI-RS configuration in accordance with the DBCH scheme.

The second scheme is that the base station broadcasts information on CSI-RS configuration to each UE by using RRC (Radio Resource Control) signaling. That is, information on CSI-RS configuration may be provided to each of the UEs within a cell by using dedicated RRC signaling. For example, while the UE is establishing connection with the base station through initial access or handover, the base station may broadcast CSI-RS configuration to the corresponding UE through RRC signaling. Alternatively, when transmitting RRC signaling message, which requests the UE of channel state feedback based on CSI-RS measurement, to the UE, the base station may notify the corresponding UE of CSI-RS configuration through the corresponding RRC signaling message.

Indication of CSI-RS Configuration

A plurality of CSI-RS configurations may be used by a given base station, and the base station may transmit a CSI-RS based on each CSI-RS configuration to the UE on a predetermined subframe. In this case, the base station may notify the UE of the plurality of CSI-RS configurations, and may notify the UE of CSI-RS which will be used for channel state measurement for CQI (Channel Quality Information) or CSI (Channel State Information) feedback.

The embodiment related to indication of CSI-RS configuration, which will be used by the UE, and of a CSI-RS, which will be used for channel measurement, from the base station will be described hereinafter.

Figure 11:
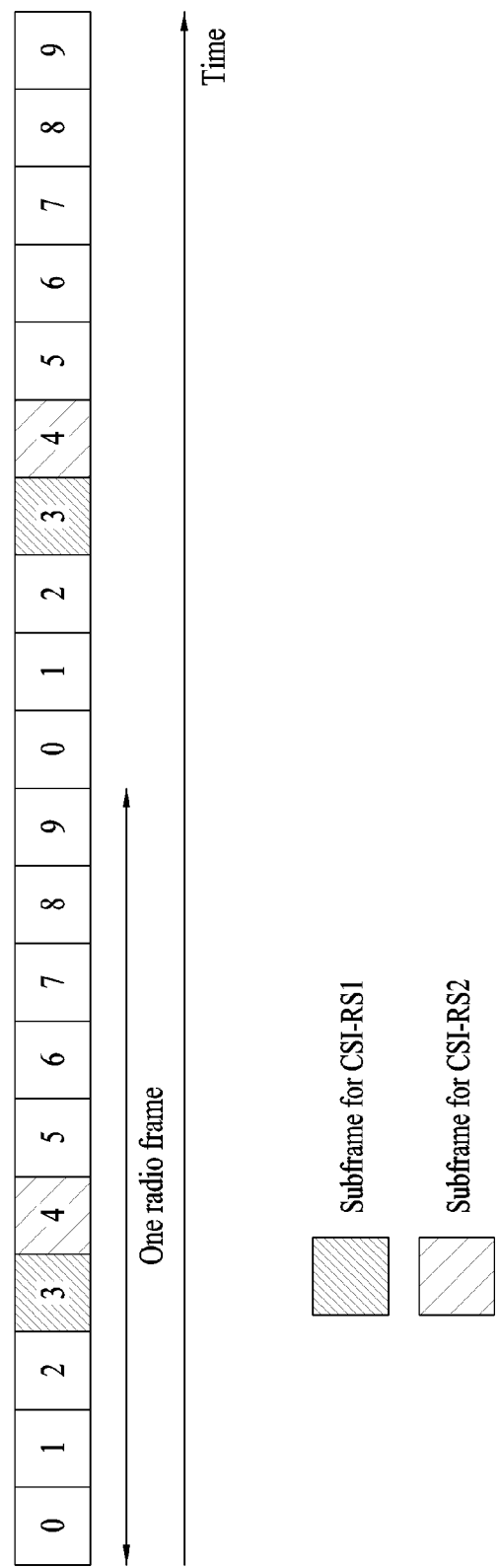
FIG. 11 is a diagram illustrating an example of two CSI-RS configurations which are used.

FIG. 11 is a diagram illustrating an example of two CSI-RS configurations which are used. FIG. 11 illustrates that one radio frame includes 10 subframes (subframe numbers 0 to 9). In FIG. 11, a first CSI-RS configuration, that is, a CSI-RS1 has a CSI-RS transmission period of 10 ms and a CSI-RS transmission offset of 3. In FIG. 11, a second CSI-RS configuration, that is, a CSI-RS2 has a CSI-RS transmission period of 10 ms and a CSI-RS transmission offset of 4. The base station may notify the UE of information on two CSI-RS configurations, and may notify the UE which one of the two CSI-RS configurations will be used for CQI (or CSI) feedback.

If the UE receives a request of CQI feedback for a specific CSI-RS configuration from the base station, the UE may perform channel state measurement by using a CSI-RS only which belongs to the corresponding CSI-RS configuration. In more detail, the channel state is determined by CSI-RS received quality and a function of the amount of noise/interference and a correlation coefficient, wherein CSI-RS received quality is measured by using the CSI-RS only which belongs to the corresponding CSI-RS configuration, and the amount of noise/interference and the correlation coefficient (for example, interference covariance matrix indicating a direction of interference) may be measured at a corresponding CSI-RS transmission subframe or designated subframes. For example, in the embodiment of FIG. 11, if the UE receives a request of feedback on the first CSI-RS configuration (CSI-RS1) from the base station, the UE may perform received quality measurement by using the CSI-RS transmitted at the fourth subframe (subframe index 3) of one radio frame, and may be designated to separately use an odd numbered subframe to measure the amount of noise/interference and the correlation coefficient. Alternatively, the UE may be designated to perform CSI-RS received quality measurement and measure the amount of noise/interference and the correlation coefficient by being restricted to a specific single subframe (for example, subframe index 3).

For example, received signal quality measured using the CSI-RS may be expressed briefly by S/(I+N) (wherein S is strength of a received signal, I is the amount of interference, and N is the amount of noise) as a signal-to-interference plus noise ratio (SINR). S may be measured through the CSI-RS at a subframe that includes the CSI-RS transmitted to the corresponding UE. Since I and N are varied depending on the amount of interference from a neighboring cell, a direction of a signal from the neighboring cell, etc., I and N may be measured through a CRS transmitted at a subframe that measures S or a subframe which is designated separately.

In this case, measurement of the amount of noise/interference and the correlation coefficient may be performed at the resource element (RE) to which the CRS or CSI-RS within the corresponding subframe is transmitted, or may be performed through a null RE configured to facilitate measurement of noise/interference. In order to measure noise/interference at the CRS or CSI-RS RE, the UE first recovers the CRS or CSI-RS and then removes the recovered result from the received signal to allow noise and interference signals only to remain, whereby a statistic value of noise/interference may be obtained. The null RE means an empty RE (that is, RE of which transmission power is 0 (zero)) where the corresponding base station does not transmit any signal, and facilitates signal measurement from another base station except the corresponding base station. Although all of the CRS RE, the CSI-RS RE and the null RE may be used to measure the amount of noise/interference and the correlation coefficient, the base station may designate REs, which will be used to measure noise/interference, for the UE. This is because that it is required to appropriately designate RE which will be measured by the corresponding UE depending on whether a signal of a neighboring cell, which is transmitted to the location of the RE where the UE performs measurement, is a data signal or a control signal. Since the signal of the neighboring cell, which is transmitted to the location of the corresponding RE, is varied depending on inter-cell synchronization, CRS configuration, and CSI-RS configuration, the base station may identify the corresponding signal and then designate the RE, which will perform measurement, for the UE. That is, the base station may designate all or some of the CRS RE, the CSI-RS RE and the null RE for the UE to measure noise/interference by using the designated RE(s).

For example, the base station may use the plurality of CSI-RS configurations, and may notify the UE of a CSI-RS configuration and a location of a null RE, which will be used for CQI feedback, while notifying the UE of one or more CSI-RS configurations. The CSI-RS configuration which will be used for CQI feedback by the UE may be expressed as CSI-RS configuration transmitted at a non-zero transmission power in view of an aspect identified from the null RE transmitted at a transmission power of 0. For example, the base station may notify the UE of one CSI-RS configuration through which the UE will perform channel measurement, and the UE may assume that the CSI-RS is transmitted at a non-zero transmission power in the one CSI-RS configuration. Additionally, the base station may notify the UE of the CSI-RS configuration transmitted at a transmission power of 0, and the UE may assume that the location of the RE of the corresponding CSI-RS corresponds to the transmission power of 0. In other words, the base station may notify the UE of the location of the corresponding null RE if the CSI-RS configuration of the transmission power of 0 exists while notifying the UE of one CSI-RS configuration of the non-zero transmission power.

As a modified example of the aforementioned indication of the CSI-RS configuration, the base station may notify the UE of the plurality of CSI-RS configurations, and may notify the UE of all or some of the CSI-RS configurations, which will be used for CQI feedback. Therefore, the UE which is requested CQI feedback for the plurality of CSI-RS configurations may measure CQI by using the CSI-RS corresponding to each CSI-RS configuration and transmit the measured CQI information to the base station.

Otherwise, the base station may designate uplink resources required for CQI transmission previously for each CSI-RS configuration, whereby the UE may transmit CQI for each of the plurality of CSI-RS configurations to the base station. Information on designation of the uplink resources may previously be provided to the UE through RRC signaling.

Otherwise, the base station may dynamically trigger CQI for each of the plurality of CSI-RS configurations to allow the UE to transmit the CQI to the base station. Dynamic triggering of CQI transmission may be performed through the PDCCH. A corresponding CSI-RS configuration for which CQI measurement will be performed will be notified to the UE through the PDCCH. The UE that has received the PDCCH may feed the result of CQI measurement for the CSI-RS configuration designated in the corresponding PDCCH back to the base station.

A transmission timing of the CSI-RS corresponding to each of the plurality of CSI-RS configurations may be designated such that the CSI-RS is transmitted at different subframes or the same subframe. If CSI-RS transmission based on different CSI-RS configurations is designated at the same subframe, it is required to identify the CSI-RSs from one another. In order to identify the CSI-RSs based on different CSI-RS configurations from one another, one or more of time resources, frequency resources and code resources of CSI-RS transmission may be applied differently. For example, the location of the RE where the CSI-RS is transmitted at the corresponding subframe may be designated differently (for example, the CSI-RS based on one CSI-RS configuration is transmitted at the location of the RE in FIG. 8(a), and the CSI-RS based on the other CSI-RS configuration is transmitted at the location of the RE in FIG. 8(b) at the same subframe) for each CSI-RS configuration (identification based on time and frequency resources). Alternatively, if CSI-RSs based on different CSI-RS configurations are transmitted at the same location of the RE, CSI-RS scrambling codes may be used differently for different CSI-RS configurations, whereby the CSI-RSs may be identified from one another (identification based on code resources).

Quasi Co-located (QC)

The UE may receive data from a plurality of transmission points (TPs), for example, TP1 and TP2. Therefore, the UE may transmit channel state information on the plurality of TPs. In this case, RSs may be transmitted from the plurality of TPs to the UE. At this time, if properties for channel estimation from different RS ports of different TPs are shared between the TPs, load and complexity of receiving processing of the UE may be lowered. Moreover, if properties for channel estimation from different RS ports of the same TP are shared between the RS ports, load and complexity of receiving processing of the UE may be lowered. In this respect, the LTE-A system suggests a method for sharing properties for channel estimation between RS ports.

For channel estimation between RS ports, the LTE-A system has introduced the concept of "quasi co-located (QCL)". For example, if a large-scale property of a radio channel to which a symbol is transmitted through one antenna port is inferred from a radio channel to which a symbol is transmitted through another antenna port, the two antenna ports may be quasi co-located. In this case, the large-scale property includes one or more of delay spread, Doppler spread, Doppler shift, average gain, and average delay. Hereinafter, the quasi co-located will simply be referred to as QCL.

In other words, if the two antenna ports are subjected to QCL, it means that the large-scale property of the radio channel from one antenna port is the same as that of a radio channel from the other one antenna port. If the antenna ports to which two different types of RSs are transmitted are subjected to QCL, the large-scale property of the radio channel from one antenna port may be replaced with that of a radio channel from the other one antenna port.

In accordance with the concept of QCL, the UE cannot assume the same large-scale property between radio channels from non-QCL antenna ports. That is, in this case, the UE should perform independent processing for each non-QCL antenna port configured for timing acquisition tracking, frequency offset estimation and compensation, delay estimation and Doppler estimation.

It is advantageous in that the UE may perform the following operations for antenna ports that may assume QCL. First of all, the UE may use the result of delay spread, Doppler spectrum, and Doppler spread estimation for a radio channel from one antenna port during channel estimation for a radio channel from another antenna port. Next, regarding frequency shift and received timing, the UE may perform time and frequency synchronization for one antenna port and then apply the same synchronization to demodulation of another antenna port. Next, regarding average received power, the UE may average RSRP (Reference Signal Received Power) measurement for two or more antenna ports.

If the UE receives a DMRS-based downlink-associated DCI format through a control channel (PDCCH or ePDCCH), the UE performs channel estimation for the corresponding PDSCH through DMRS sequence and then performs data demodulation. For example, if a configuration of a DMRS port received by the UE from a downlink scheduling grant may be subjected to QCL assumption with a CRS port, the UE may apply an estimation value of a large-scale property of a radio channel estimated from the CRS port during channel estimation through the corresponding DMRS port as it is. This is because that the estimation value for the large-scale property may be acquired from the CRS more stably because the CRS is a reference signal broadcasted at a relatively high density over a full band per subframe. On the other hand, the DMRS is transmitted UE-specifically for a specific scheduled RB, and a precoding matrix used for transmission by the base station may be varied in a unit of PRG, whereby a valid channel received by the UE may be varied in a unit of PRG. Therefore, performance degradation may be generated when the DMRS is used for estimation of the large-scale property of the radio channel over a broad band. Since the CSI-RS has a relatively long transmission period and low density, performance degradation may also be generated when the CSI-RS is used for estimation for the large-scale property of the radio channel.

That is, QCL assumption between the antenna ports may be used for reception of various downlink reference signals, channel estimation, channel state report, etc.

Method for Canceling Interference

Generally, a cellular mobile communication system reaches a system capacity limit by means of inter-cell interference in a downtown environment. Also, if the base station transmits a multi-layer signal of multiple beams by using a multiple transceiving antenna transmission scheme, that is, SU-MIMO or MU-MIMO transmission scheme, inter-layer interference within a cell determines a limit of system capacity. Therefore, in order to reduce inter-cell interference and intra-cell interference, importance of a downlink cooperative transmission scheme and a high fidelity reception scheme has come into the spotlight.

According to the downlink cooperative transmission scheme, a transmitter transmits beams on the basis of channel state information reported from a receiver to minimize inter-cell interference and intra-cell interference. This scheme does not increase complexity of the UE during data reception but its performance depends on exactness in reporting channel state information. Unlike this scheme, the high fidelity reception scheme is to obtain better reception performance by using properties of an interfering signal. In the high fidelity reception scheme, it is important how the UE acquires information on an interfering signal transmitted together with a desired signal. Representative examples of the high fidelity reception scheme include a linear MMSE (Minimum Mean Square Error) IRC (Interference Rejection Combining) receiver, a maximum likelihood detection receiver, and an interference cancellation receiver. In the high fidelity reception scheme, information on more interfering signals is required if performance becomes better. For example, an iterative decoding interference cancellation receiver known as a receiver of which performance is the best regenerates an interfering signal to decode and cancel the interfering signal, whereby information for decoding is required.

In the LTE system, the base station transfers information required for decoding of a PDSCH, which is a desired signal, to the UE through DCI of a PDCCH. The PDCCH, which includes CRC parity bits, is transmitted for error detection, wherein the CRC parity bits are scrambled with C-RNTI given to the UE to indicate a UE to which the corresponding PDCCH is transmitted. The UE performs PDCCH decoding several times on a PDCCH search space given thereto, and if CRC of the result of decoding is the same as C-RNTI allocated to the UE, the UE determines that DCI within the corresponding PDCCH has PDSCH scheduling information transmitted to the UE.

Method for Canceling Interference According to the Present Invention

Hereinafter, a method for efficiently transmitting scheduling information of an interfering PDSCH co-scheduled with a desired PDSCH to a UE to improve interference canceling capability of a high fidelity receiver will be described.

Figure 12:
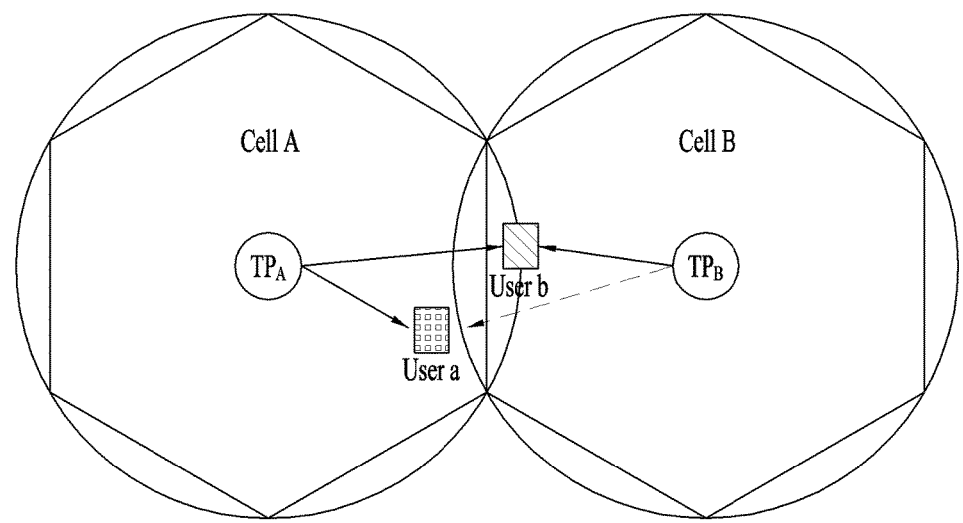
FIG. 12 is a structural diagram illustrating a system to which a method for receiving data in accordance with the present invention may be applied.

FIG. 12 illustrates an example of a downlink of a cell cooperative scheme based on multi-layer transmission rate control. For convenience of description, a cell controlled by a base station A will be referred to as a cell A, and a user equipment which performs communication with the base station A will be referred to as UE a. Likewise, a cell B and a UE b exist for a neighboring base station B. Since the cell A and the cell B use the same radio resource, the UE b which is located at the cell edge is subjected to interference from the cell A.

In this case, the base station A may divide data of the UE a into two layers of private data and common data and simultaneously transmit the two layers in a method of superposition coding. The UE a decodes the common data in a state that interference based on dedicated data exists. Afterwards, the UE a recovers a received signal of the common data to remove an interfering signal of the common data from the actually received signal and decodes the dedicated data.

The base station B transmits dedicated data only which correspond to the data of the UE b, and the UE b demodulates or decodes the common data transmitted from the cell A in a state that the interfering signal from its dedicated data and dedicated data of the UE a exists, and regenerates the interfering signal from the common data. However, the UE b cancels and discards interference, which is caused from the common data, from the received signal because the common data generally correspond to the data of the UE a. As a result, the UE b may decode its dedicated data at a higher received SINR.

As described above, each UE should receive two or more superposed data layers (common data and dedicated data). Data for the UE a may be configured as the common data. In this case, the UE b may perform interference cancellation (IC) for all the data of the UE a. Also, for the UEs of the cell A, the UE b may transmit its data by dividing the data into dedicated data and common data, whereby UEs of the cell A may perform IC for the common data of the UE b.

Through the above operation, the UE b cancels all or some of the interference of the cell A to increase its data reception rate or the probability of decoding success. In view of the UE b, the common data of the UE a may be referred to as an interfering PDSCH, and its dedicated data may be referred to as a desired PDSCH. At this time, the UE b needs scheduling information of the interfering PDSCH as well as the desired PDSCH to cancel the interfering PDSCH.

First Embodiment

In the first embodiment of the present invention, a method for transmitting scheduling information on a desired PDSCH and an interfering PDSCH through one kind of DCI will be described.

In a SU-MIMO transmission scheme of the LTE system, when data are transmitted using two or more layers, two transport blocks (TBs) are transmitted to cancel interference between the layers. If decoding of one of the two TBs is successfully performed, the UE may regenerate a transmitting signal of the corresponding TB and extracts the corresponding signal from the received signal and again perform decoding for the other TB in an environment where interference between the layers is canceled. To this end, DCI of the SU-MIMO may include MCS information for each of the TB1 and the TB2 , a new data indicator, and information on redundancy version.

In the first embodiment according to the present invention, DCI of the SU-MIMO for transmitting and receiving an interfering PDSCH is applied to the method for canceling interference according to the present invention. Hereinafter, for convenience of description, the transport blocks (TBs) will be referred to as a desired TB and an interfering TB. Also, scheduling information of the desired TB and the interfering TB is notified through one kind of DCI, and this DCI will be referred to as unified DCI.

However, unlike DCI on a plurality of TBs in the SU-MIMO, the unified DCI according to the present invention should consider the followings to cancel inter-cell interference.

First of all, each of the desired TB and the interfering TB may be transmitted through an independent transmission mode (TM).

If the desired TB and the interfering TB are restricted to be always transmitted through the same TM, a transmission rate of an interfering cell may be deteriorated due to scheduling restriction of the interfering cell. Therefore, each of the desired TB and the interfering TB should be transmitted through an independent TM.

In order to configure the TM of the interfering TB, the TM of the interfering TB may be indicated through RRC signal in the same manner as a method for configuring the TM of the desired TB. However, as the UE scheduled for a neighboring cell is varied dynamically, the TM of the interfering PDSCH may be varied dynamically, whereby semi-static RRC signaling may not be appropriate. Therefore, it is preferable that a field for dynamically notifying the UE of the TM of the interfering TB is added to the unified DCI.

Meanwhile, if it is not designated whether each TB is the desired TB or the interfering TB when information on the plurality of TBs in the unified DCI is notified to the UE, the UE cannot know whether a specific TB is the desired TB or the interfering TB during DCI decoding. At this time, although the UE may identify the corresponding TB through a flag or MAC address within the TB, the UE may know whether the corresponding TB is the desired TB or not, only after TB decoding is performed successfully. Therefore, it is preferable that a field for notifying the UE of the TM of the desired TB as well as the interfering TB is added to the unified DCI.

Second, the desired TB and the interfering TB may be demodulated based on their respective RSs different from each other.

As scheduling of the interfering cell is performed independently from the serving cell, the RS for demodulation of the interfering TB may be different from that for demodulation of the desired TB. Therefore, whether demodulation of the interfering TB is based on CRS or DMRS may be notified through a 1-bit field in the DCI. For example, if the 1-bit field is 1, the UE performs demodulation of the interfering signal by using the DMRS of the interfering cell, and if the 1-bit field is 0, the UE performs demodulation of the interfering signal by using the CRS of the interfering cell. If the UE previously has CRS/DMRS configuration information of the interfering cell, the UE performs demodulation with reference to the CRS/DMRS configuration information.

The 1-bit information may be transferred to the UE semi-statically through RRC signaling in addition to the DCI. In this case, the UE may perform interference cancellation on the basis of either the CRS or DMRS of the neighboring cell until next RRC signal is reconfigured.

Alternatively, frequency and time resources for performing CRS based transmission and DMRS based transmission may previously be identified from each other and scheduled between the UE and the interfering cell. For example, the interfering cell is scheduled to perform CRS based transmission at an odd numbered subframe and perform DMRS based transmission at an even numbered subframe, and the base station notifies the UE of the scheduled transmission through RRC signaling. The UE may perform CRS based interference cancellation or DMRS based interference cancellation depending on whether its PDSCH exists at an odd numbered subframe or an even numbered subframe.

Third, QC (Quasi collocation) and rate matching may be configured for the desired TB and the interfering TB through an independent PQI (PDSCH RE mapping and quasi co-location indicator).

Since the desired TB and the interfering TB may be transmitted from their respective TPs different from each other as shown in FIG. 12, different kinds of QC and rate matching information will be required for each TB. To this end, it is preferable that a PQI field for the desired TB and a PQI field for the interfering TB are defined respectively in the unified DCI.

For example, when each of the desired TB and the interfering TB is received through a transmission mode (TM) 10, the UE refers to the PQI of the interfering TB in the unified DCI to perform interference cancellation. The PQI Of the interfering TB includes interfering CSI-RS index subjected to QCL with the interfering DMRS, PDSCH starting symbols of the interfering cell, ZP-CSIRS resources, and CRS resource information.

Additionally, the PQI of the interfering TB may include virtual cell ID information for generating a DMRS. Although the virtual cell ID is tied with nSCID of the DMRS in the current LTE system, the virtual cell ID may not be tied with nSCID in a new LTE system and one of virtual cell IDs configured by RRC may be designated using the PQI. The CRS resource information may be some or all of cell ID of an interfering CRS, a CRS shift value, the number of ports, and MBSFN subframe.

The PQI field for the desired TB and the PQI field for the interfering TB in the unified DCI may be configured in accordance with a TM of each TB. For example, if the desired TB is transmitted through TM 10 and the interfering TB is transmitted through TM 4, the desired TB needs PQI information to increase DMRS based demodulation performance but the interfering TB performs CRS based demodulation, whereby the interfering TB may perform demodulation without PQI information. Therefore, the unified DCI includes the PQI field for the desired TB but may not include the PQI field for the interfering TB.

Fourth, a method for transmitting DMRS information on the interfering TB may be considered.

In the LTE release-11, DMRS information of the neighboring TB is notified for CoMP as follows. The base station previously notifies the UE of two virtual cell IDs through RRC signaling, and notifies the UE which one of the two cell IDs is a cell index for generating DMRS sequence, through DCI. The information transmitted through the DCI is a value tied with 1-bit nSCID, and one of the two virtual cell IDs is determined depending on whether nSCID is 0 or 1.

This system may be applied to the DMRS information of the interfering TB. Simply, 1-bit nSCID of each of the desired TB and the interfering TB may be transmitted, whereby one of the virtual cell IDs which are RRC signaled may be selected. At this time, a virtual cell ID set tied with the 1-bit nSCID of the interfering TB is different from a virtual cell ID set tied with the 1-bit nSCID of the desired TB. For example, the base station may notify the UE of each of a virtual cell ID set {1, 2} which will be applied to DMRS demodulation of the desired TB and a virtual cell ID set {3, 4} which will be applied to DMRS demodulation of the interfering TB, through RRC signaling. The UE selects the virtual cell ID which will be applied to DMRS demodulation of the desired TB and the virtual cell ID which will be applied to DMRS demodulation of the interfering TB within the corresponding virtual cell ID set by using the 1-bit nSCID of each of the desired TB and the interfering TB. Otherwise, the UE may perform blind detection for the virtual cell ID used actually for DMRS transmission by a virtual cell within the virtual cell ID set RRC signaled from the base station and try DMRS demodulation of the interfering TB through the detected ID.

Otherwise, in order to simplify RRC signaling, the virtual cell ID set tied with the 1-bit nSCID of the interfering TB and the virtual cell ID set tied with the 1-bit nSCID of the desired TB may commonly be restricted such that a single set is always selected. For example, if an interfering cell index is selected as 1 as the virtual cell ID set tied with the 1-bit nSCID of the interfering TB is {1, 2} and nSCID is set to 0, the UE generates an interfering DMRS by means of cell index=1 and nSCID=0, and estimates an interfering channel. However, this operation enables interference cancelation only if an interfering cell 1 transmits a DMRS by means of nSCID=0 by allowing the cell index to be tied with nSCID.

As another method, the nSCID and the virtual cell ID of the interfering TB may not be tied with each other for signaling. That is, an additional field for designating a virtual cell ID as well as nSCID may be defined in the DCI of the interfering TB. At this time, even though the interfering cell transmits a DMRS for a given nSCID, the interfering signal may be canceled. However, additional overhead for virtual cell ID signaling is required. If four neighboring cells which are adjacent to one another on average are dominant interfering cells in view of one UE, for virtual cell ID signaling, a 2-bit field may additionally be defined in the unified DCI. As described above, the virtual cell ID information may be transmitted through the PQI.

As still another method, the base station may transfer only the virtual cell ID information to the UE without transferring nSCID information of the interfering TB. In this case, since the UE does not know a value of an nSCID seed of the interfering DMRS, the UE performs DMRS blind demodulation for each of nSCID 0 and nSCID 1.

Also, as a more advanced method, the base station may perform joint encoding for nSCID of the desired TB and control information of the interfering TB to transmit interference DMRS information to the UE. For example, the base station may configure one of four virtual cell IDs by performing joint encoding for nSCID information of the desired TB and nSCID information of the interfering TB. As a result, the UE may identify an interfering DMRS transmitted from one of the four neighboring TPs, and may cancel the corresponding interfering PDSCH. For example, if a set of nSCID of the desired TB and nSCID of the interfering TB includes (0, 0), (0, 1), (1, 0), and (1, 1), virtual cell IDs 1, 2, 3 and 4 for each of the set of nSCID of the desired TB and nSCID of the interfering TB may be configured for the UE. If (0, 0) is received, the UE generates the interfering DMRS by means of cell index=1 and nSCID=0 and performs estimation of the interfering channel. However, this operation enables interference cancelation only if the interfering cell 1 transmits the DMRS by means of nSCID=0 as the cell index has been tied with nSCID. Even in the case that the nSCID and the virtual cell ID of the interfering TB are not tied with each other for signaling, the base station may notify the UE of more virtual cell IDs by performing joint encoding for the nSCID of the desired TB and the virtual cell ID information of the interfering TB. DMRS information for decoding the desired TB depends on the nSCID of the desired TB and virtual cell ID tied with the nSCID of the desired TB in the same manner as the existing method.

In the current LTE system, nSCID information is transmitted by being joint encoded with the number of DMRS antenna ports and layers. The nSCID information of the interfering TB may be transmitted by being joint encoded with the number of DMRS antenna ports and layers of the interfering TB in the same manner as the existing method. If the UE cancels the interfering signal without decoding after demodulation, some of the existing joint encoded information will not be required for interference cancellation. For example, if codeword information and retransmission of the interfering signal are not important, the UE may cancel information related to retransmission from the field for the interfering TB and may not interpret the corresponding field differently per codeword.

Moreover, if the number of maximum layers of the interfering signal which will be subjected to interference cancellation IC is restricted, the field may be optimized to correspond to the maximum layers. For example, if the number of maximum layers of the interfering signal which will be subjected to interference cancellation IC is limited to 4, Table 4 may be used instead of joint encoded values of Table 3 used in the current LTE system. That is, the number of DMRS antenna ports and layers and nSCID of the interfering TB may be transferred. If the number of maximum layers of the interfering signal which will be subjected to interference cancellation IC is limited to 1, the 2-bit field may be designed by values 0, 1, 2 and 3 only as illustrated in Table 4. If the number of maximum layers of the interfering signal which will be subjected to interference cancellation IC is limited to 2 and the first layer of the interfering signal is always transmitted to a port 7, the 2-bit field may be designed by values 0, 1, 4 and 5 only as illustrated in Table 4. The following Tables 3 to 6 illustrate examples of an antenna port and scrambling ID indicator field included in the DCI.

TABLE 3

| 1 codeword: Codeword 0 enable Codeword 1 disable | | 2 codeword: Codeword 0 enable Codeword 1 enable | |
|---|---|---|---|
| Value | Message | Value | Message |
| 0 | 1 layer, port 7, SCID = 0 | 0 | 2 layer, port 7, 8, SCID = 0 |
| 1 | 1 layer, port 7, SCID = 1 | 1 | 2 layer, port 7, 8, SCID = 1 |
| 2 | 1 layer, port 8, SCID = 0 | 2 | 3 layers, port 7, 8, 9 |
| 3 | 1 layer, port 8, SCID = 1 | 3 | 4 layers, port 7, 8, 9, 10 |
| 4 | (ReTx) 2 layers, port 7, 8 | 4 | 5 layers, port 7~11 |
| 5 | (ReTx) 3 layers, port 7~9 | 5 | 6 layers, port 7~12 |
| 6 | (ReTx) 4 layers, port 7~10 | 6 | 7 layers, port 7~13 |
| 7 | Reservered | 7 | 8 layers, port 7~14 |

TABLE 4

| Value | Message |
|---|---|
| 0 | 1 layer, port 7, SCID = 0 |
| 1 | 1 layer, port 7, SCID = 1 |
| 2 | 1 layer, port 8, SCID = 0 |
| 3 | 1 layer, port 8, SCID = 1 |
| 4 | 2 layer, port 7, 8, SCID = 0 |
| 5 | 2 layer, port 7, 8, SCID = 1 |
| 6 | 3 layers, port 7, 8, 9 |
| 7 | 4 layers, port 7, 8, 9, 10 |

The nSCID information of the interfering TB may be transferred without being tied with the number of DMRS antenna ports and layers of the interfering TB unlike the existing method. The nSCID information of the interfering TB may be transmitted dynamically through a specific field within the DCI or may be transmitted through RRC signaling. Alternatively, the nSCID information may be fixed to a specific value (for example, nSCID=0). If the UE cancels the interfering signal without decoding after demodulation, information on the number of DMRS antenna ports and layers of the interfering TB does not need codeword information and information related to retransmission, and if the number of maximum layers of the interfering signal which will be subjected to interference cancellation IC is restricted, the field may be optimized to correspond to the maximum layers. For example, if the number of maximum layers of the interfering signal which will be subjected to interference cancellation IC is limited to 4, a field illustrated in Table 5 may be used. In values 0, 1 and 2 of Table 5, the DMRS is not tied with the nSCID, whereby the nSCID may be signaled to the UE or set to a fixed value (for example, nSCID=0). For another example, if the number of maximum layers of the interfering signal which will be subjected to interference cancellation IC is limited to 1, the 1-bit field may be defined by values 0 and 1 only as illustrated in Table 5.

TABLE 5

| Value | Message |
|---|---|
| 0 | 1 layer, port 7 |
| 1 | 1 layer, port 8 |
| 2 | 2 layer, port 7, 8 |
| 3 | 3 layers, port 7, 8, 9 |

For another example, if the number of maximum layers of the interfering signal which will be subjected to interference cancellation IC is limited to 4 and the first layer of the interfering signal is fixed to use a port 7, a field illustrated in Table 6 may be used. For still another example, if the number of maximum layers of the interfering signal which will be subjected to interference cancellation IC is limited to 2 and the first layer of the interfering signal is fixed to use a port 7, the 1-bit field may be defined by values 0 and 1 only as illustrated in Table 6.

TABLE 6

| Value | Message |
|---|---|
| 0 | 1 layer, port 7 |
| 1 | 2 layer, port 7, 8 |
| 2 | 3 layers, port 7, 8, 9 |
| 3 | 4 layers, port 7, 8, 9, 10 |

Fifth, a method for transmitting CRS information on the interfering TB may be considered.

If the interfering TB is transmitted based on the CRS, the UE should exactly know a configuration of the interfering CRS. That is, the base station should notify the UE of cell ID of the interfering CRS, a CRS shift value, the number of ports, and MBSFN subframe. The interfering CRS may be configured in such a manner that a plurality of interfering CRS candidates may be configured previously through RRC and one of the CRS candidates may be signaled through the DCI. Alternatively, one of the plurality of CRS candidates used for CRS IC may be signaled through the DCI. However, in this case, among CRS based interfering PDSCHs, only an interfering PDSCH of a TP which joins IC may be canceled.

If the interfering TB is transmitted based on the CRS, the UE may receive TPMI (Transmitted Precoding Matrix Indicator) information of the interfering signal from the base station and use the received TPMI information for IC. For example, if the interfering cell is operated in a TM 4, the UE should know precoding information used by the interfering cell to normally perform IC. This is because that the estimated channel is different from an interference effective channel to which precoding is applied even though the UE normally estimates the interfering channel from the CRS of the interfering cell. The precoding information of the interfering cell may be transferred to the TPMI of the interfering TB within the DCI.

Sixth, scheduling information of the interfering TB may be transmitted through a field of a fixed size within the DCI.

As described above, TM information of the interfering TB exists in the unified DCI. However, since the UE cannot know the TM information of the interfering TB until DCI decoding is completed, the UE should perform blind decoding (BD) for various DCI formats per TM. As one method for reducing the number of BD times, the base station may transmit scheduling information of the interfering TB by using the field of which size is always fixed within the DCI. Considering possible TM and DCI format, the base station determines a maximum bit size required for transmission of the scheduling information and then always transmits the scheduling information of the interfering TB through the maximum bit regardless of the TM. If the scheduling information of the interfering TB is small, the other bits are filled with zero-padding, whereby the scheduling information may always be transmitted with a fixed size.

Seventh, an independent QC (QCL) behavior may be configured for each of the desired TB and the interfering TB.

It is preferable that the UE performs demodulation on the assumption of different QC (QCL) behaviors for each of the desired PDSCH and the interfering PDSCH. If the UE performs demodulation by applying QCL behavior of the desired TB to the interfering TB, problems may occur as follows. For example, it is assumed that the desired TB and the interfering TB of the UE are received respectively through TM 9 and TM 10 and QCL behavior A is configured based on the TM of the serving cell. At this time, if the UE demodulates the interfering TB in accordance with the QCL behavior A, the UE uses QCL information between a serving cell CRS and the interfering DMRS, whereby demodulation may be failed. Therefore, in this case, it is preferable that the UE is operated by QCL behavior B when demodulating the interfering TB. This is because that the QCL behavior A assumes channel property based on all the RSs but the QCL behavior B assumes channel property in the CSI-RS only connected with the DM-RS.

If both the desired TB and the interfering TB of the UE are received through TM 9, it is preferable that the QCL behavior A is commonly applied to the two TBs. However, the CRS, the DMRS and the CSI-RS to which the QCL behavior A will be applied should not be tied with one another per TB. That is, although the same behavior A is applied to the CRS, the DMRS and the CSI-RS, different TPs are applied thereto. For example, when demodulating the interfering TB, the UE applies the QCL behavior A among a CRS, a DMRS and a CSI-RS of the base station, which transmits the interfering TB, to the interfering TB. Likewise, when demodulating the desired TB, the UE applies the QCL behavior A among a CRS, a DMRS and a CSI-RS of a serving base station, which transmits the desired TB, to the desired TB.

For another example, if the desired TB and the interfering TB of the UE are received respectively through TM 9 and TM 4, the QCL behavior A may be applied to the two TBs. However, when demodulating the interfering TB of TM 4, which corresponds to CRS based transmission, the UE uses the CRS only of the base station that transmits the interfering TB. Likewise, when demodulating the desired TB, the UE applies the QCL behavior A among a CRS, a DMRS and a CSI-RS of a serving base station, which transmits the desired TB, to the desired TB.

Eighth, a validity flag is configured for the interfering TB.

The validity flag for the interfering TB may be configured within the unified DCI, whereby it may be determined whether the interfering TB will be discarded or received after interference cancelation is performed. That is, in the example of FIG. 12, although the common data received by the UE B from the TP A are generally unnecessary data, if the common data are required for the UE B, the validity flag may be used to indicate that the common data are required for the UE B. As the interfering TB is configured validly, QCL is configured differently to enable TB-selective DPS (Dynamic Point Selection). Also, at this time, the number of layers of each TB is equally set to each TB, whereby DCI size may be reduced.

Ninth, some information of the interfering TB may be omitted.

For example, starting symbol information of the interfering TB may be omitted.

At this time, if the PDSCH of the interfering cell starts prior to the PDSCH of a transmitting cell, the UE may perform interference demodulation from a starting symbol of the desired PDSCH and perform IC. Therefore, it is preferable that the PDSCH of the interfering cell, which transmits common data, is restricted to always start simultaneously with or prior to the PDSCH of the transmitting cell. As a result, the UE may efficiently perform IC without PDSCH starting symbol information of the interfering TB.

For another example, rate matching information of the interfering TB may be omitted.

At this time, if the UE performs interference demodulation only instead of interference decoding to perform IC, the presence of rate matching information of the interfering PDSCH little affects performance. Therefore, the rate matching information of the interfering TB may be omitted for saving of control information.

For another example, resource allocation (RA) information of the interfering TB may be omitted.

At this time, if a resource region of the interfering TB is restricted to always include a resource region of the desired TB, the UE may perform IC by removing the interfering PDSCH from the resource region of the desired TB after demodulating the interfering PDSCH even there is no resource allocation information of the interfering TB.

Tenth, if both the interfering TB and the desired TB correspond to DMRS based transmission, the sum of the number of layers of the interfering TB and the desired TB may be restricted so as not to exceed n. Even though the UE has IC capability of the interfering PDSCH, it is preferable that the sum of the number of layers of the interfering TB and the desired TB is restricted considering the capability of the UE. Also, even though the UE has high computation power, it is preferable that the sum of the number of layers of the interfering TB and the desired TB is restricted to assure DMRS demodulation performance. For example, if the interfering PDSCHs of two layers are received from three interfering cells through ports 7 and 8 in addition to the desired TB of two layers, DMRS demodulation of the interfering PDSCH having the lowest received signal power is likely to be failed. This is because that IC of the other interfering PDSCHs may be disturbed by error propagation if the UE performs successive interference cancellation for the interfering PDSCH having the lowest received signal power.

Alternatively, the number of layers of the interfering TB that performs IC may be restricted so as not to exceed n. Even though the UE has IC capability of the interfering PDSCH, it is preferable that the sum of the number of layers of the interfering TB is restricted considering the capability of the UE. Also, even though the UE has high computation power, it is preferable that the sum of the number of layers of the interfering TB is restricted to assure DMRS demodulation performance. For example, if the interfering PDSCHs of two layers are received from three interfering cells through ports 7 and 8 in addition to the desired TB of two layers, DMRS demodulation of the interfering PDSCH having the lowest received signal power is likely to be failed. This is because that IC of the other interfering PDSCHs may be disturbed by error propagation if the UE performs successive interference cancelation for the interfering PDSCH having the lowest received signal power.

Eleventh, the UE may Determine whether to Perform IC Dynamically.

If a channel size is lower than a given level after an interfering RS is received, it may be preferable that the UE does not perform IC of the corresponding interfering TB. This is because that the UE fails to normally demodulate/decode the interfering signal under such a status and regenerates an incorrect interfering signal and removes the regenerated signal from the received signal. Even though the interfering signal is strong based on long term signal strength such as RSRP, it is preferable that the UE finally determines whether to perform IC dynamically against instantaneous deep fading of the interfering channel.

Twelfth, in DMRS based transmission, the common data may be restricted to be transmitted through the port 7 only.

In DMRS based transmission, the common data may be restricted to be transmitted through the port 7 only, whereby the UE may perform IC more simply. In this case, since port information of the interfering TB is not required to be signaled separately, control information resources may be saved. Also, even though the interfering channel is estimated by blind decoding of the UE without DMRS information, the UE for the port 7 has only to perform blind decoding, whereby complexity may be reduced. Also, in addition to the port 7, some of the ports, which transmit the common data, may be restricted to transmit the common data by considering IC performance gain.

Thirteenth, a new QCL behavior for canceling the interfering PDSCH may be defined.

For example, a new QCL behavior C for canceling the interfering PDSCH may be defined. The QCL behavior C means QCL between a DMRS and a CRS. QCL may be assumed for all or some of Doppler shift, Doppler spread, average delay, and delay spread as described above.

If the UE feeds back CSI on the interfering channel to perform IC of the interfering PDSCH, the interfering cell may perform IC more efficiently by performing scheduling considering CSI. For example, the interfering cell may transmit data at a lower MCS level by considering the CSI which is fed back, whereby the UE may successfully perform demodulation or decoding for the interfering PDSCH. However, at this time, additional feedback overhead will be required for configuration of the interfering CSI-RS for interfering channel CSI feedback, and performance of the interfering cell may be degraded due to the configuration of the low MCS level. Therefore, the UE may perform IC without feedback of CSI of the interfering channel. In this case, the CSI-RS of the interfering cell is not required to be configured for the UE, QCL behavior that assumes QCL between the CSI-RS and the DMRS is not preferable. For example, in FIG. 12, the UE b performs IC of the DMRS based interfering PDSCH received from the base station A in a state that CSI-RS of the base station A is not configured for the UE b. At this time, QCL between the CRS and the DMRS of the base station not QCL between the CSI-RS and the DMRS may be considered to increase DMRS demodulation performance for the base station A.

Second Embodiment

Although the scheduling information of the desired TB and the interfering TB has been transmitted through one kind of DCI in the first embodiment of the present invention, the scheduling information of the desired TB and the scheduling information of the interfering TB may be transmitted through their independent DCI. According to the second embodiment, the scheduling information of the desired TB and the scheduling information of the interfering TB may be transmitted through their independent DCI.

For convenience of description, DCI that includes the scheduling information of the desired TB will be referred to as desired DCI, and DCI that includes the scheduling information of the interfering TB will be referred to as interfering DCI. The base station may notify the UE whether IC is performed through the desired DCI, and may also notify the UE of scheduling information of some of interfering PDSCHs and search space information of the interfering DCI.

The twelve matters described in the first embodiment may be applied to the desired DCI and the interfering DCI of the second embodiment.

For example, first of all, the desired DCI and the interfering DCI may be transmitted through their independent mode. Second, the desired DCI and the interfering DCI may be demodulated on the basis of their respective RSs different from each other. Third, QC and rate matching may be configured for the desired DCI and the interfering DCI through each independent PQI of the desired DCI and the interfering DCI. Fourth, the method for transmitting DMRS information may be considered for the interfering DCI. Fifth, the method for transmitting CRS information may be considered for the interfering DCI. Sixth, the scheduling information of the interfering DCI may be transmitted through a field of a fixed size within the DCI. Seventh, an independent QC behavior may be configured for each of the desired DCI and the interfering DCI. Eighth, a validity flag may be configured for the interfering DCI. Ninth, some information of the interfering DCI may be omitted. Tenth, if both the desired DCI and the interfering DCI correspond to DMRS based transmission, the sum of the number of layers of the desired DCI and the interfering DCI may be restricted so as not to exceed n. Eleventh, the UE may determine whether to perform interference cancellation dynamically. Twelfth, in DMRS based transmission, the common data may be restricted to be transmitted through the port 7 only. Since the respective matters are equally applied to the description made in the first embodiment, their detailed description will be omitted.

Meanwhile, a 1-bit flag may be added to the desired DCI, and as a result, whether the interfering DCI is transmitted may be configured for the UE. If the flag is set to 1, the UE performs blind decoding to decode the interfering DCI.

For another example, a new field may be added to the desired DCI to notify the UE of search space information of the interfering DCI, and the UE may reduce the number of blind decoding times by using the information. If the interfering DCI exists at a PDCCH UE specific search space, C-RNTI, an aggregation level, PDCCH candidates, etc. may be designated for the desired DCI, whereby the search space of the interfering DCI may be reduced. If a 2-bit field is set to indicate the aggregation level, the UE performs blind decoding BD for the corresponding aggregation level only. In order to transmit C-RNTI information, the base station previously shares several C-RNTIs with the UE through RRC signal, and the UE performs blind decoding BD through C-RNTI designated through the desired DCI. Alternatively, the UE performs BD of the interfering DCI for several C-RNTIs through the RRC signal. C-RNTIs shared through the RRC signal may be a third C-RNTI set used for IC. Additionally, the base station may designate a PDCCH candidate, for which the UE performs BD among the PDCCH candidates of the interfering DCI, through the desired DCI.

Likewise, if the interfering DCI exists at the PDCCH common search space, the 1-bit field may be configured to indicate the aggregation level. The UE identifies PDCCH candidates through third cell ID used exclusively for the interfering DCI and performs BD.

Figure 13:
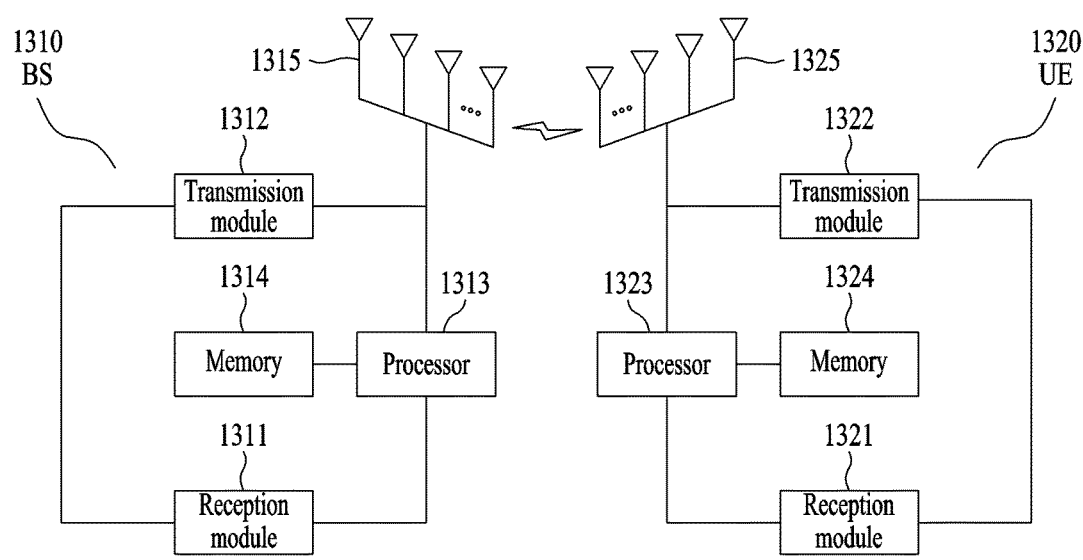
FIG. 13 is a diagram illustrating configurations of a base station and a user equipment, which may be applied to one embodiment of the present invention.

FIG. 13 is a diagram illustrating a base station and a user equipment, which may be applied to one embodiment of the present invention.

If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 13, the wireless communication system includes a base station 1310 and a user equipment 1320. The base station 1310 includes a processor 1313, a memory 1314, and radio frequency (RF) units 1311 and 1312. The processor 1313 may be configured to implement procedures and/or methods suggested in the present invention. The memory 1314 is connected with the processor 1313 and stores various kinds of information related to the operation of the processor 1313. The RF unit 1316 is connected with the processor 1313 and transmits and/or receives a radio signal. The user equipment 1320 includes a processor 1323, a memory 1324, and radio frequency (RF) units 1321 and 1322. The processor 1323 may be configured to implement procedures and/or methods suggested in the present invention. The memory 1324 is connected with the processor 1323 and stores various kinds of information related to the operation of the processor 1323. The RF units 1321 and 1322 are connected with the processor 1323 and transmit and/or receive a radio signal. The base station 1310 and/or the user equipment 1320 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been herein described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The present invention may be used for wireless communication devices such as a user equipment, a relay and a base station.

What is claimed is:

1. A method for canceling interference and receiving data by a user equipment in a wireless communication system, the method comprising:
receiving unified downlink control information (DCI) from a first base station,
wherein the unified DCI comprising a first DCI including a scheduling information for receiving a first downlink shared channel (PDSCH) and a second DCI including a scheduling information for receiving a second PDSCH; and
simultaneously receiving:
the first PDSCH from the first base station in accordance with the scheduling information included in the first DCI of the unified DCI received from the first base station, and
the second PDSCH from a second base station in accordance with the scheduling information included in the second DCI of the unified DCI received from the first base station;
canceling interference of the second PDSCH based on the scheduling information for receiving the second PDSCH included in the unified DCI,
wherein the first PDSCH and the second PDSCH are transmitted by the first and second base stations through respective transmission modes independent from each other,
wherein the unified DCI comprises a field for notifying the user equipment of the transmission modes of the second PDSCH,
wherein the first DCI and the second DCI are quasi co-located through their respective PQIs (PDSCH RE mapping and quasi co-location indicator) independent from each other, and
wherein each of the PQIs includes a virtual cell ID (identifier) for generating a demodulation reference signal (DMRS).

2. The method according to claim 1, wherein the second DCI is configured to omit an information on a starting symbol of the interfering channel, and the interfering channel is configured to start prior to the PDSCH.

3. The method according to claim 1, further comprising the step of receiving a validity flag as to whether data received through the interfering channel will be discarded after the interference cancelation, by using the second DCI.

4. The method according to claim 1, wherein the scheduling information included in the second DCI is transmitted through a field of a fixed size within the second DCI.

5. The method according to claim 1, wherein the first DCI and the second DCI are configured by their respective quasi co-located behaviors independent from each other.

6. The method according to claim 1, wherein the first DCI and the second DCI are demodulated based on their respective reference signals (RSs) different from each other.

7. The method according to claim 1, wherein a rate matching information is omitted for the second DCI, and interference demodulation instead of interference decoding is only performed for the interfering channel.

8. The method according to claim 1, wherein, if both the first DCI and the second DCI correspond to DMRS based transmission, the sum of the number of layers of the first DCI and the second DCI is restricted so as not to exceed a reference value.

9. The method according to claim 1, further comprising the step of receiving an information on quasi co-located configuration between a common reference signal (CRS) and a demodulation reference signal (DMRS) for the second base station.

10. A user equipment for canceling interference and receiving data in a wireless communication system, the user equipment comprising:
radio frequency (RF) units; and
a processor, wherein the processor is configured to:
receive unified downlink control information (DCI) from a first base station,
wherein the unified DCI comprising a first DCI including a scheduling information for receiving a first downlink shared channel (PDSCH) and a second DCI including a scheduling information for receiving a second PDSCH; and
simultaneously receive:
the first PDSCH from the first base station in accordance with the scheduling information included in the first DCI of the unified DCI received from the first base station, and
the second PDSCH from a second base station in accordance with the scheduling information included in the second DCI of the unified DCI received from the first base station;
cancel interference of the second PDSCH based on the scheduling information for receiving the second PDSCH included in the unified DCI,
wherein the first PDSCH and the second PDSCH are transmitted by the first and second base stations through respective transmission modes independent from each other,
wherein the unified DCI comprises a field for notifying the user equipment of the transmission modes of the second PDSCH,
wherein the first DCI and the second DCI are quasi co-located through their respective PQIs (PDSCH RE mapping and quasi co-location indicator) independent from each other, and
wherein each of the PQIs includes a virtual cell ID (identifier) for generating a demodulation reference signal (DMRS).

* * * * *